(12) United States Patent
Ogram (10) Patent No.: US 8,102,078 B2
(45) Date of Patent: *Jan. 24, 2012

(54) DYNAMIC ELECTRICAL CONVERTER SYSTEM

(75) Inventor: Mark Ellery Ogram, Tucson, AZ (US)

(73) Assignee: Sefe, Inc., Scottsdale, AZ (US)

( * ) Notice: Subject to any disclaimer, the term of this patent is extended or adjusted under 35 U.S.C. 154(b) by 561 days.

This patent is subject to a terminal disclaimer.

(21) Appl. No.: 12/231,663

(22) Filed: Sep. 4, 2008

(65) Prior Publication Data

US 2010/0007321 A1    Jan. 14, 2010

Related U.S. Application Data

(63) Continuation-in-part of application No. 12/218,297, filed on Jul. 14, 2008, now Pat. No. 7,855,476.

(51) Int. Cl.
*H02G 11/00* (2006.01)

(52) U.S. Cl. .......... 307/82; 307/145; 307/149; 361/218; 361/230

(58) Field of Classification Search .................... 307/80, 307/82–84, 130, 145, 149; 361/212, 215, 361/216, 217, 218, 230, 231; 174/2; 244/30, 244/31
See application file for complete search history.

(56) References Cited

U.S. PATENT DOCUMENTS

| | | | | |
|---|---|---|---|---|
| 4,730,122 A | * | 3/1988 | Dreibelbis et al. | 307/75 |
| 5,521,603 A | * | 5/1996 | Young | 342/198 |
| 5,923,516 A | * | 7/1999 | Young | 361/111 |
| 2009/0212758 A1 | * | 8/2009 | Asinovski et al. | 323/355 |

\* cited by examiner

*Primary Examiner* — Fritz M Fleming
(74) *Attorney, Agent, or Firm* — Mintz Levin Cohn Ferris Glovsky and Popeo, P.C.

(57) ABSTRACT

A dynamic electrical converter system configured to receive a variable voltage input which is then converted to a proper electrical configuration for a load. The converter assembly utilized multiple converters, each of which is configured to accept a unique range of voltages and from these voltages creating the desired electrical output configuration. A monitor checks the incoming voltage and by controlling switches going to each of the converters, selectively closes the circuit to the appropriate converter; thereby, routing the incoming voltage to the converter capable of addressing the incoming voltage.

20 Claims, 5 Drawing Sheets

DYNAMIC ELECTRICAL CONVERTER SYSTEM

This is a continuation in part of U.S. patent application Ser. No. 12/218,297, filed on Jul. 14, 2008 now U.S. Pat. No. 7,855,476, and entitled, "Atmospheric Electrical Generator".

BACKGROUND OF THE INVENTION

This invention relates to the production of electrical energy and more particularly to the a conversion system for variable electrical voltages.

Everyone is familiar with Benjamin Franklin's kite experiment of 1752. Using a kite whose string had become wet, negative charges from the passing clouds flowed into the string, down to the suspended key, and then into a Leyden jar via a thin metal wire. Franklin was protected by a dry silk string; but, when Franklin's knuckle came too close to the key, he received a strong shock. Fortunately, Benjamin Franklin was not killed, others who tried this same experiment were not so lucky.

Since then, the formation of lightning has remained something of a mystery. Lightning bolts are triggered when a negatively charged cloud base induces a positive charge from the ground, thereby forming a "pathway" for the discharge of the collected electrical energy.

Lightning travels up to 60,000 miles per hour with a flash that is brighter than ten million 100-watt lightbulbs. This wattage is as much power as is produced by all of the electricity plants in the United States and with a voltage of up to 300 million volts.

It is this very fact, the power within lightning is immense, that has prevented any successful collection of the electrical energy from lightning. The electricity in lightning is far too extreme for current technology to harness.

While lightning has attracted a energy starved industrial world, no one has developed any technique to harness this naturally occurring electrical source.

It is clear there is a continuing need for an electrical source other than carbon-based fuels and that the naturally occurring electricity in the atmosphere is being ignored.

SUMMARY OF THE INVENTION

The invention is a mechanism which taps into the naturally occurring static electricity in the atmosphere. Whereas heretofore, the attempt to garner electricity from the atmosphere has focused exclusively on capturing lightning, the present invention syphons off the static electricity which is generated from any agitated air and voids lightning.

Lightning is only the final discharge of the static electricity, whether that lightning is intra-cloud lightning, cloud-to-ground lightning, or inter-cloud lightning. Other types of final discharges are known as heat lightning, summer lightning, sheet lightning, ribbon lightning, silent lightning, ball lightning, bead lightning, elves, jets, and sprites. Well before these discharges are observed, as the atmosphere becomes agitated by wind or thermal, static electricity is being generated.

The present invention recognizes that this static electricity is being formed and creates a mechanism to capture it.

The mechanism of this invention utilizes an aircraft such as a lighter than air balloon. While the preferred embodiment uses a foil balloon, a variety of other aircraft are obvious to those of ordinary skill in the art, including, but not limited to: gliders, rubber balloons (such as weather balloons), biaxially-oriented polyethylene terephthalate polyester film balloons, and latex balloons.

Within this discussion, the balloon is referenced, but, the invention is not intended to be limited solely to balloons.

The balloon is sent aloft and is tethered by a conductive line. In this context, the conductive line may be any obvious to those of ordinary skill in the art. For the preferred embodiment, the conductive line is a generically referred to as a "poly-rope" and is commercially available through a variety of sources. A suitable conductive line is described in U.S. Pat. No. 5,203,542, entitled "Apparatus for Improved Electric Fence Wire Construction for use with Intensive Grazing" issued Apr. 20, 1993, to Coley, et al. and incorporated hereinto by reference.

The conductive line is played out of a winch to control the altitude of the balloon. The motor controlling the winch is able to reverse direction to both extend and withdraw the conductive line which is wrapped around a spool on the winch. The winch/spool combination are part of a base unit.

In some embodiments of the invention, the spool is constructed of rubber so as to insulate the conductive line from the winch assembly. In this embodiment, only the conductive line is charged by the atmospheric static electricity while the winch remains neutral.

In yet another embodiment, the winch/spool are part of a base unit which is itself isolated from the ground by an insulator. In this embodiment, the entire base unit is charged by the atmospheric static electricity.

A conductor, such as an insulated wire, is electrically connected to the conductive line. In one embodiment, where the conductive line is electrically isolated from the spool and winch motor, the conductor is connected to the conductive line. In the embodiment where the conductive line is electrically connected to the base unit, then the conductor is connected anywhere on a metalic base unit.

The other end of the conductor is connected to a load. The load in this case can be any of a variety of electrical loads well known to those of ordinary skill in art, including, but not limited to a motor, a battery system, or the electrical grid for the system.

In the preferred embodiment, a sensor array is used to monitor the activities both at the base unit (such as electrical flow within the conductor) and in the surrounding locale.

A sensor monitoring the electrical flow (i.e. voltage and/or current) within the conductor is used to monitor the electrical activity within the conductor.

In the preferred embodiment, a lightning sensor monitors for lightning activity within the locale. As noted earlier, the electrical characteristic of lightning is so extreme that ideally this discharge is avoided as it might damage the mechanism of this invention.

The sensor array is utilized by a controller, such as microprocessor, programmed to operate the mechanism as outlined herein.

The controller operates the winch motor to extend or withdraw the conductive line and by extension the altitude of the balloon. The controller is programmed to operate the winch by monitoring the electrical characteristics of the conductor and adjusting the balloon's altitude to maintain these characteristics within the conductor within a preset range.

This preset range is established either in the base programming of the controller or is established by an operator of the system.

As example, by controlling the amount of current being withdrawn from the atmosphere, the mechanism operates within a safe range and also provides a relatively stable current flow from which a variety of activities can take place (such as DC-AC conversion).

The controller also utilizes the lightning sensor to protect the mechanism from a lightning strike. Should lightning be detected within a pre-determined range (as established by the software or defined by an operator), then the balloon is pulled down to minimize the risk of damage from a lightning strike.

Another aspect of the invention relates to the electrical system which accepts the fluctuating atmospheric charge and changes it into an acceptable configuration for either the desired load or for the existing power grid.

Power grids in the United States operate with a frequency of 60 hertz in an alternating current arrangement. While this basic configuration seems to be universally accepted, the voltage within the grid varies dramatically, such as 15 kv, 34 kv, 69 kv, and even 112 kv.

Each atmospheric generator is placed proximate to or within easy access to a specific grid; this establishes the required electrical output configuration (i.e. that which is accepted by the power grid). As example, one of the atmospheric electrical collector units as described above collects the atmospheric electrical power as direct current and then supplies the appropriate power grid a specific flow (as example, AC, 60 hertz, at 69 kv).

The difficulty lies the fact that the DC current being garnered from the atmosphere varies depending on the actual agitation being generated in the atmosphere. This means that the source of DC current is fluctuating.

The present invention uses a monitoring system which checks the input DC voltage. Depending on the actual voltage being received, the appropriate converter is connected to the input DC voltage so that the desired output is obtained.

As example, suppose the DC input voltage is 1500 volts, the monitoring system, sensing this input, closes the switch connecting the DC voltage to a converter which accepts DC voltage in the range of 1000-2000 volts which then delivers an AC, 60 hertz 69 kv signal to the power grid. If the DC input voltage increases to 2100 volts, then the monitoring system opens the switch to the first converter (1000-2000 volts) and closes the switch to a second converter (such as 2000-4000 volts) to deliver the desired output of AC (60 hertz, 69 kv) for the power grid.

In this manner, regardless of the fluctuating input DC voltage, the electrical grid is supplied with a fully configured electrical input conforming to the needs of that specific electrical grid.

Another aspect of the present invention is the use of a tower or permanent structure instead of an aircraft. In this embodiment, the building or tower is electrically isolated from the ground and a rod (similar to a lightning rod) is extended into the atmosphere. The rod collects the atmospheric charge which is conveyed via an electrical conduit (ideally insulated) where the collected DC charge is reconfigured to meets the need of the locale.

In this context, for one embodiment of the invention, a tower is placed onto the top of a building. The tower is electrically isolated from the building using such mechanisms well known to those of ordinary skill in the art such as rubber mats. A rod ideally extends from the top of the tower to facilitate the collection of the DC electrical energy.

A converter mechanism such as described above, is connected to the tower to flow the DC electricity to a converter which modifies the DC current for the specific application. In one application, the DC current is converted to the electrical needs of the building, thereby providing at least some of the electrical requirements of the building itself.

As noted earlier, the dynamic converter system of the present invention allows a power generator to address a variable voltage in an efficient manner. This makes the dynamic converter system ideal for a variety of alternative energy sources such as the above described atmospheric electrical generator and other alternative energy sources such as wind and wave powered systems. In these systems, the energy being generated must be converted to a proper electrical configuration for a identified load. This may be a particular motor or connection to the power grid which act as a load to the power generating mechanism.

For these energy generating systems, the converter assembly of this invention utilizes multiple converters. Each converter is configured to accept a unique range of voltages and from these voltages, create the desired electrical configuration. By using multiple converters, a full range is available, from a minimum voltage input to a maximum voltage input.

As example, suppose the output voltage needs to be 55 kv AC, but the input voltage usually ranges from 20 kv DC to 100 kv DC. By using four different converts, this 80 kv DC range is broken into:

1) converter A accepting 20 kv DC to 40 kv DC and converting it to 55 kv AC;
2) converter B accepting 40 kv DC to 60 kv DC and converting it to 55 kv AC;
3) converter C accepting 60 kv DC to 80 kv DC and converting it to 55 kv AC; and,
4) converter A accepting 80 kv DC to 100 kv DC and converting it to 55 kv AC.

Those of ordinary skill in the art readily recognize a variety of other arrangement.

A monitor checks the incoming voltage recognizes this voltage as being addressed by a particular converter, and, by controlling switches going to each of the converters directs the input voltage appropriately. Carrying on with the above example, assume the monitor determines that the incoming voltage is 56 kv DC, then converter B is activated by selectively closing the switch associated with converter B and keeping the switches for the other converters open.

In this manner, only the appropriate converter is used for whatever the incoming voltage is.

For the situation of wind power, this permits the wind power generator to operate even in "light" winds and "heavy" winds when the amount of electricity being generated varies significantly from the desired levels. With the increased operating capability, the wind power generator is able to provide a much larger overall energy flow.

The invention, together with various embodiments thereof will be more fully explained by the following description of the accompanying drawings.

DRAWINGS IN DETAIL

Figures 1, 2:
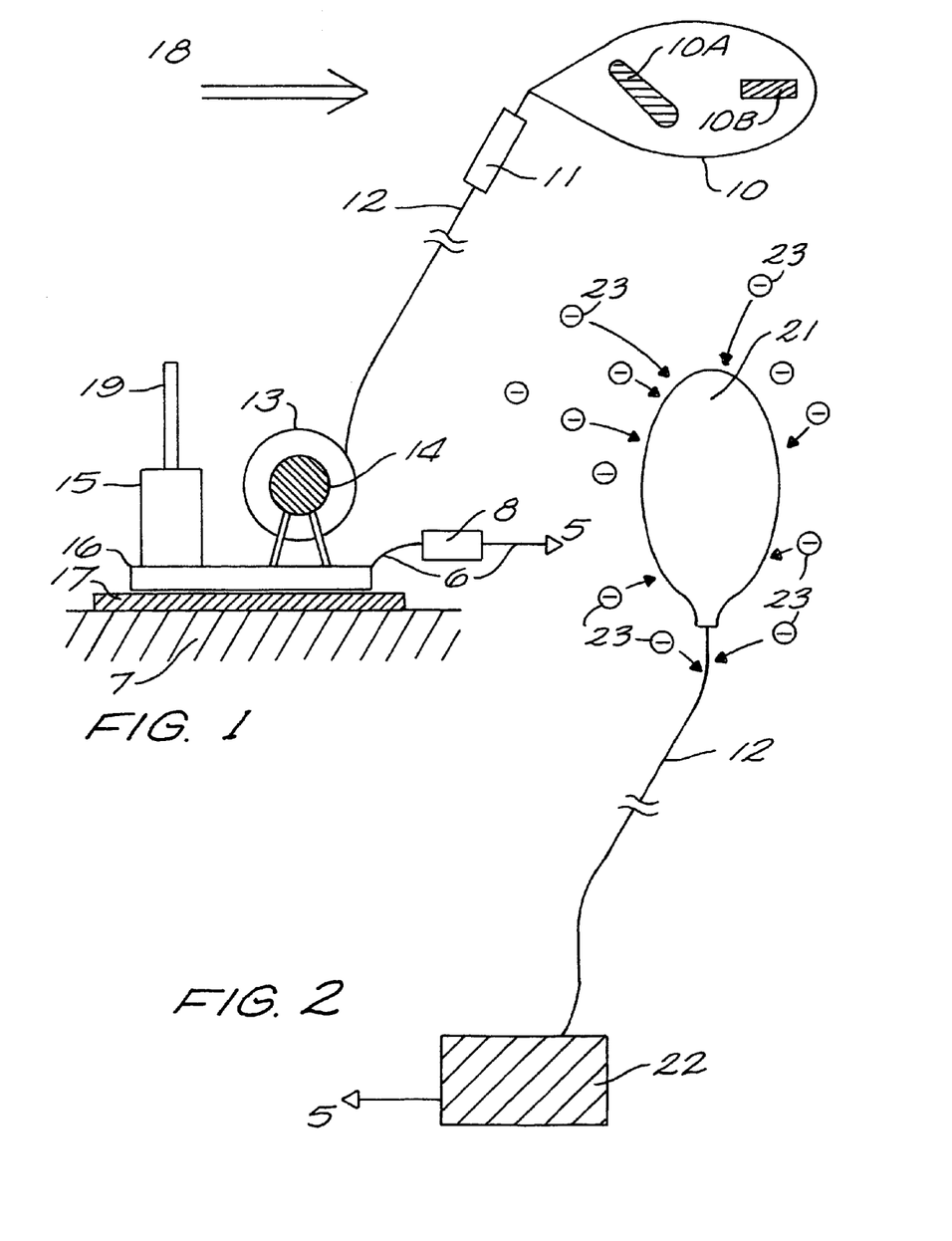
FIG. 1 diagrams the preferred embodiment of the invention.
FIG. 2 illustrates the collection of the negative charged particles in the atmosphere.

FIG. 1 diagrams the preferred embodiment of the invention.

Balloon 10 is an aircraft which, in this illustration, is a lighter than air balloon. Wings 10A, extending from the body of balloon 10, provide additional lift in air flow 18. Tail 10B helps to stabilize balloon 10.

Balloon 10 is tethered to the ground via conductive line 12. As noted earlier, a variety of configurations and materials are available to serve as conductive line 12. In this illustration, a poly-wire is used. Poly-wire is commercially available through a variety of vendors, including, but not limited to: Jeffers Livestock and Sareba Systems, Inc. of Ellendale, Minn.

In this embodiment, located proximate to balloon 10, is an electrical collection enhancement lead 11 which assists in the collection of the static electrical charge in the atmosphere. Electrical collection enhancement lead 11 is configured to attract the static charge and conduct the charge into the conductive line 12.

The electricity flows down the conductive line into spool 13, where the conductive line 12 is collected and either withdrawn or dispensed through operation of winch motor 14.

Winch motor 14 and spool 13 are mounted onto base unit 16 which is electrically isolated from ground 7 using insulator 17. Note, in this embodiment of the invention, when electricity is being collected from the atmosphere, the entire base unit 16 becomes charged. In another embodiment of the invention, spool 13 is constructed of rubber, thereby preventing base unit 16 from becoming charged, thereby restricting the charging from the atmosphere to only conductive line 12.

In this embodiment, conductor 6 is connected to base unit 16 (since the entire base unit 16 is charged and the base unit is metalic) to communicate the electrical current to load 5. Conductor 6 is ideally an insulated wire.

The electrical current through conductor 6 is measured using sensor 8.

In the alternative embodiment discussed above, where only the conductive line 12 is charged, then conductor 6 is connected to conductive line 12.

Controller 15, located in this embodiment on base unit 16, operates winch motor 14 in response to signals from sensor 8 (measuring the current being discharged to load 5) to maintain the current flow within a pre-defined range. As the current flow diminishes, then the conductive line 12 extended from spool 13 to increase the altitude of balloon 10 to that more static charge from the atmosphere is gathered; as the current flow falls exceeds a preset level, conductive line 12 is withdrawn onto spool 13 to decrease the static charge being collected from the atmosphere.

The range of current flow through conductor 6 is ideally set by the program, although some embodiments of the invention permit an operator to establish this range of operation.

In an alternative embodiment, the sensor monitoring conductor 6 monitors the voltage therein.

In the preferred embodiment of the invention, controller 15 is also equipped with a lightning sensor 19. In this embodiment, when lightning is sensed within a preset range, then substantially all of conductive line 12 is wound onto spool 13 to pull balloon 10 near the ground and protect the entire mechanism from being damaged from a lightning discharge.

In the preferred embodiment, the "safe" distance form lightning is set in the programming of controller 15 and is ideally two miles; other embodiments permit the operator to "safe" distance.

There are a variety of lightning sensors well known to those of ordinary skill in the art, including, but not limited to those described in: U.S. Pat. No. 7,016,785, entitled "Lightning Detection" issued to Makela, et al. on Mar. 21, 2006; U.S. Pat. No. 6,829,911, entitled "Lightning Detection and Prediction Alarm Device" issued to Jones, et al. on Dec. 7, 2004; U.S. Pat. No. 7,200,418, entitled "Detection of Lightning" issued to Karikuranta, et al. on Apr. 3, 2007; and U.S. Pat. No. 6,961,662, entitled "Systems and Methods for Spectral Corrected Lightning Detection" issued to Murphy on Nov. 1, 2005; all of which are incorporated hereinto by reference.

In another embodiment of the invention, controller 15 is not located on base unit 16, rather it is remote and communicates its control signals to winch motor 14 using radio waves.

FIG. 2 illustrates the collection of the negative charged particles in the atmosphere.

Static charges 23 are generated in the atmosphere by agitated air. These static charges are often collected at the bottom of clouds, but exist in other environments as well.

Balloon 21 is extended into this strata of static charges 23 which are then attracted to conductive line 12 to flow to base unit 22 and then onto load 5.

By increasing or decreasing the altitude of balloon 21 (defined by the length of the extended conductive line 12), conductive line 12 is selectively exposed to varying densities and levels of the static charge strata, and by extension, the current flow or voltage is increased or decreased.

Figure 3:
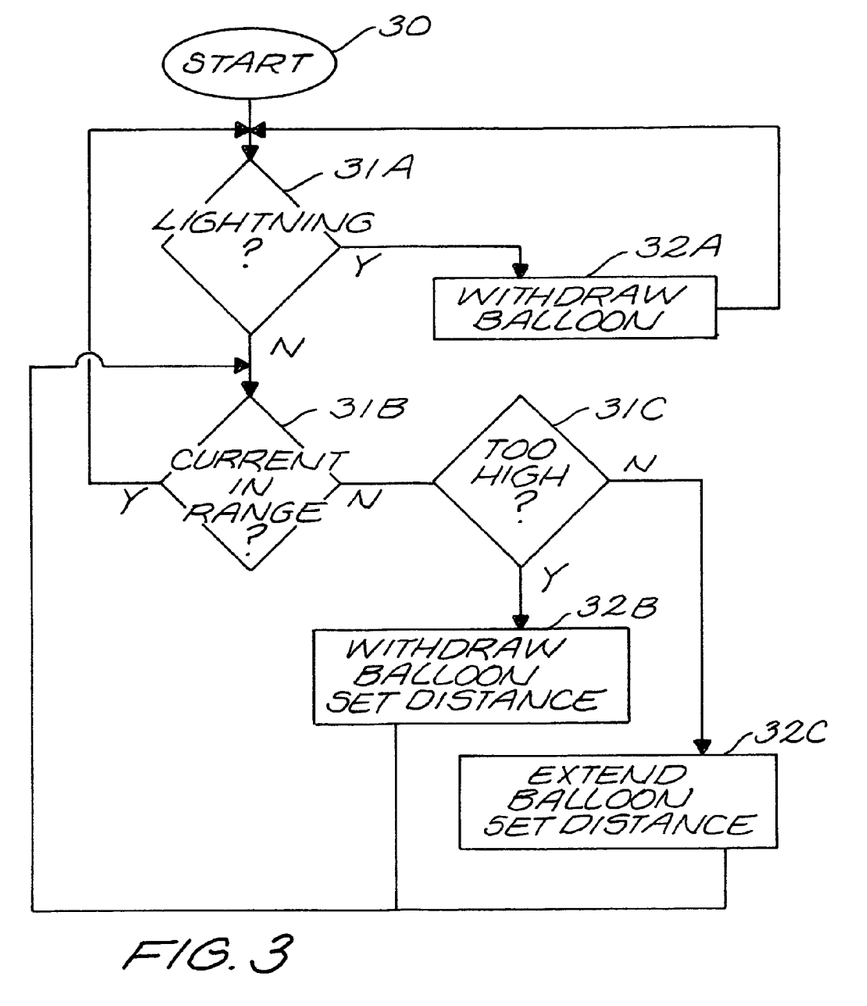
FIG. 3 is a flow-chart of the operation of the controller for the preferred embodiment of the invention.

FIG. 3 is a flow-chart of the operation of the controller for the preferred embodiment of the invention.

Once the program starts 30, the lightning sensor is checked to determine if lightning has occurred within the unsafe range 31A, if it has, then the balloon is lowered 32A, and the program continues monitoring the status of lightning until no lightning is detected.

When the lightning status is acceptable, then the current within the conductor is checked to see if the current is within the prescribed range 31B. If the current is acceptable (within range) the program returns to check the lightning status 31A; otherwise a determination is made to see if the current is above the prescribed range 31C.

If the current is above the prescribed range, then the altitude of the balloon is withdrawn a set amount 32B (ideally twenty-five feet) and the program loops back to see if the current is within range 31B.

If the current is below the prescribed range, then the altitude of the balloon is extended a set amount 32C (ideally twenty-five feet) and the program loops back to see if the current is within range 31B.

In this manner of feed-back and minor adjustments in the altitude of the balloon, the current is maintained within a prescribed range which can be handled by the downstream electrical system.

As noted earlier, some embodiments of the invention monitor the voltage instead of the current.

Figure 4A:
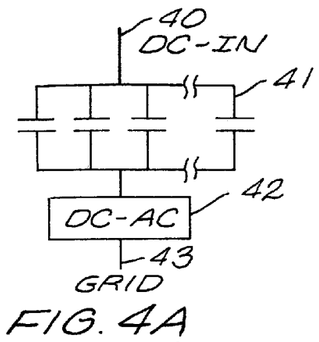
FIGS. 4A, 4B, and 4C are electrical schematics for handling the static charge from the atmosphere.
Figure 4B:
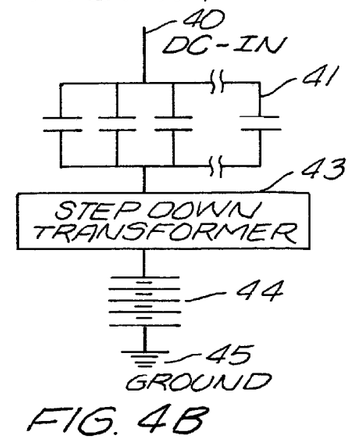
Figure 4C:
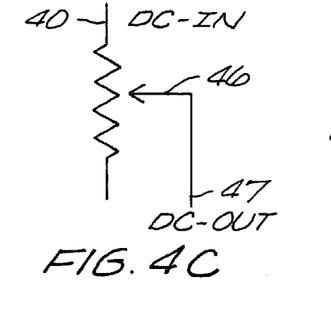

FIGS. 4A, 4B, and 4C are electrical schematics for handling the static charge from the atmosphere.

By maintaining the voltage being collected in a prescribed range, an electrical conversion system is easily designed. While FIGS. 4A, 4B, and 4C illustrate some electrical configurations, those of ordinary skill in the art readily recognize a variety of other configurations which will serve the same function.

Referencing FIG. 4A, Direct Current In (DC IN) 40 is buffered by a gang of capacitors 41 before being communicated to a DC/AC converter 42. The DC/AC converter converts the direct current into a an alternating current suitable for placement over an existing electrical grid 43 such as normally found from a power-plant.

Those of ordinary skill in the art readily recognize a variety of DC/AC converters, including, but not limited to: U.S. Pat. No. 7,394,671, entitled "Controller IC, DC-AC Conversion Apparatus, and parallel running system of DC-AC Conversion Apparatuses" issued to Fukumoto, et al. on Jul. 1, 2008; and, U.S. Pat. No. 7,330,366, entitled "DC-AC Converter" issued to Lee, et al. on Feb. 12, 2008; all of which are incorporated hereinto by reference.

FIG. 4B illustrates an electrical arrangement suitable for use in charging a battery. DC IN 40 is buffered by capacitor bank 41 before entering into a step down transformer 43. Step down transformer 43 reduces the voltage so that the voltage can safely be introduced into battery 44 which is connected to ground 45 at the battery's other pole.

Those of ordinary skill in the art readily recognize a variety of batteries which will work in this capacity, including, but not limited to those described in: U.S. Pat. No. 7,378,181, entitled "Electric Storage Battery Construction and Manufacture" issued to Skinlo on May 27, 2008; U.S. Pat. No. 7,388,350, entitled "Battery with Electronic Compartment" issued to Wright on Jun. 17, 2008; U.S. Pat. No. 7,397,220, entitled "Connection Member and Battery Pack" issued to Uchida, et al. on Jul. 8, 2008; and, U.S. Pat. No. 7,375,492, entitled "Inductively Charged Battery Pack" issued to Calhoon, et al. on May 20, 2008; all of which are incorporated hereinto by reference.

In FIG. 4C, DC IN 40 is fed into an adjustable rheostat 46 which is controlled by the controller so that the DC OUT 47 falls within a specified range.

Figure 5:
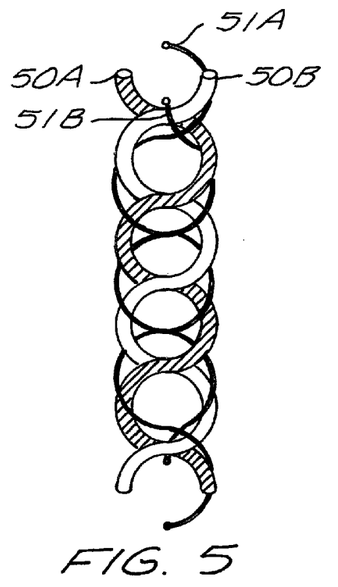
FIG. 5 illustrates a conductive line used in the preferred embodiment of the invention.

FIG. 5 illustrates a conductive line used in the preferred embodiment of the invention.

This type of conductive line is commonly called poly-wire and consists of multiple interwoven strands of plastic 50A and 50B woven into a cord or rope arrangement having intertwined therein exposed metal wires 51A and 51B. While this illustration shows two plastic strands and two metal wires, any number of possible combinations is possible.

The exposed metal wires 51A and 51B attract the atmospheric static charge and transmit the charge down to the base unit (not shown).

Figure 6A:
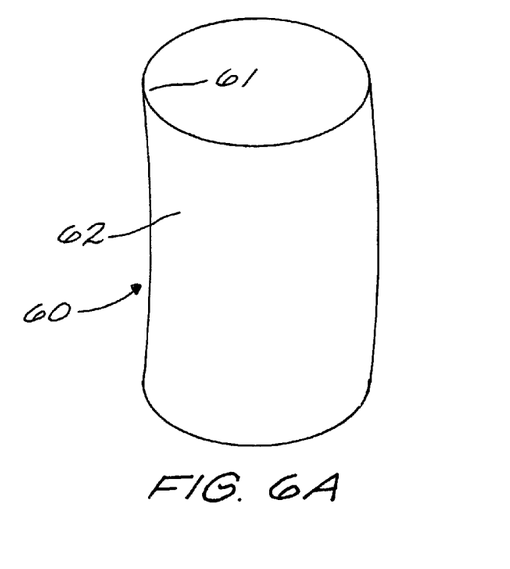
FIGS. 6A and 6B illustrate an alternative conductive line creating an ionized pathway for the flow of the static charges from the atmosphere.
Figure 6B:
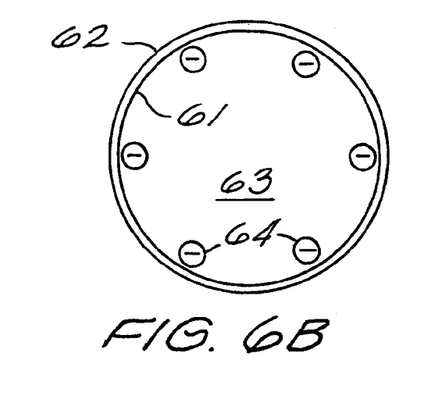

FIGS. 6A and 6B illustrate an alternative conductive line creating an ionized pathway for the flow of the static charges from the atmosphere.

This conductive line utilizes a tube 60 having an outer layer 62 of PET Film (Biaxially-oriented polyethylene terephtalate polyester film) which provides exceptionally high tensile strength and is chemically and dimensionally stable. The tube has an ideal diameter of between two and three inches.

An interior metal coating 61 provides an initial conduit for the flow of static charge. The static charge through the metal forces the tube to expand due to the repulsion experienced by like charges. Further, the flow of electricity causes the interior of the tube 60 to become ionized to provide an additional pathway for the atmospheric static charges to the base unit (not shown).

Because outer layer 62 provides a gas barrier, the resulting ionization is not dissipated by air currents, thereby providing a highly stable pathway.

Figures 7, 8B:
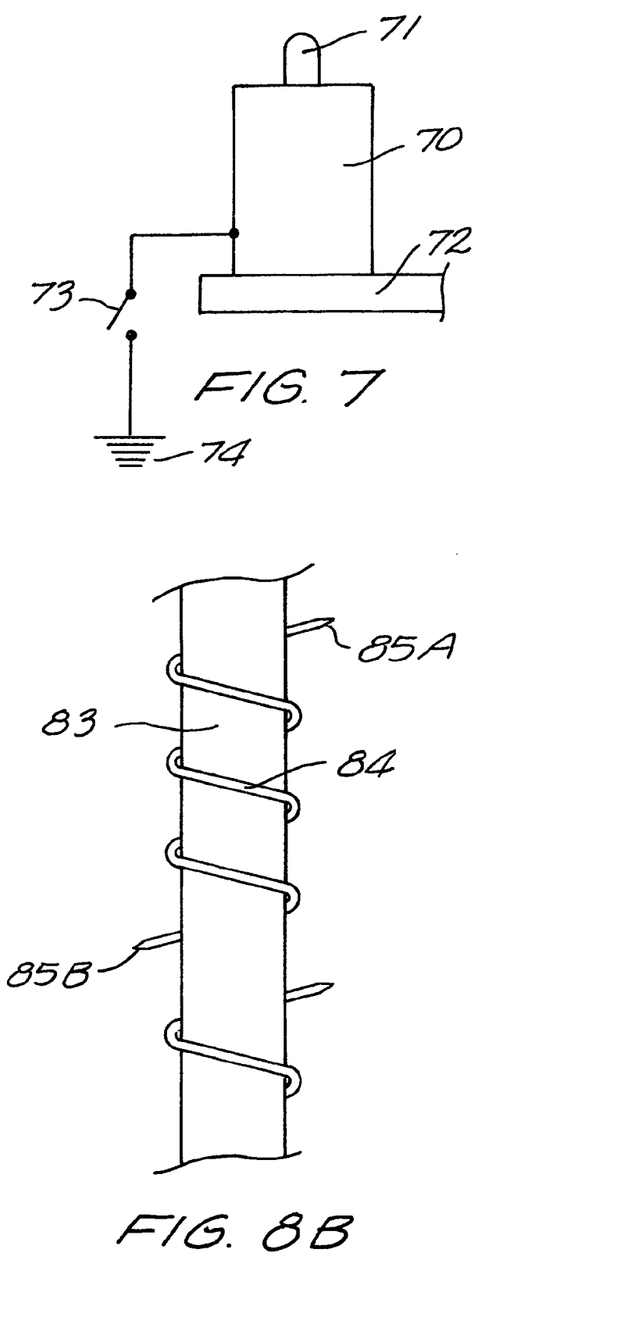
FIG. 7 illustrates the controller of an alternative embodiment and the associated safety devices.
FIGS. 8A and 8B illustrate two embodiments of enhanced electrical collection leads.

FIG. 7 illustrates the controller of an alternative embodiment and the associated safety devices.

In this embodiment, controller box 70, resting on insulating pad 72, is in communication with the sensors as described above. Using the input from these sensors, when there is flow of electricity through the base unit, warning flashing light 71 is illuminated. To electrically neutralize the mechanism, switch 73 is activated to pass any existing current into the ground 74.

Figure 8A:
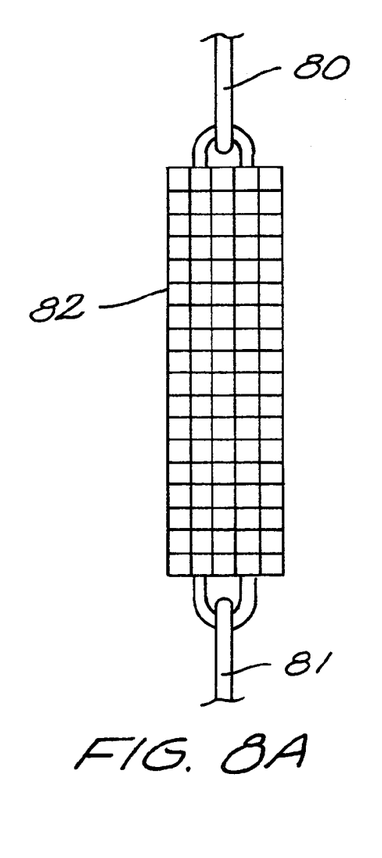

FIGS. 8A and 8B illustrate two embodiments of enhanced electrical collection leads.

Referencing FIG. 8A, enhanced electrical collection lead 82 is a wire mesh which is in electrical communication with conductive line 81 and balloon 80. Because of the significant amount of metal exposed by enhanced electrical collection lead 82, more static electricity from the atmosphere is drawn to the collection lead 82, and then down conductive line 81 to the base unit (not shown).

Conductive lead 82 is positioned proximate to balloon 80.

In FIG. 4B, poly-wire 83 has enhanced electrical collection leads 84 wrapped therearound. Collection leads 84 have pointed ends 85A and 85B which have a propensity to attract more electricity than rounded ends do.

Figure 9:
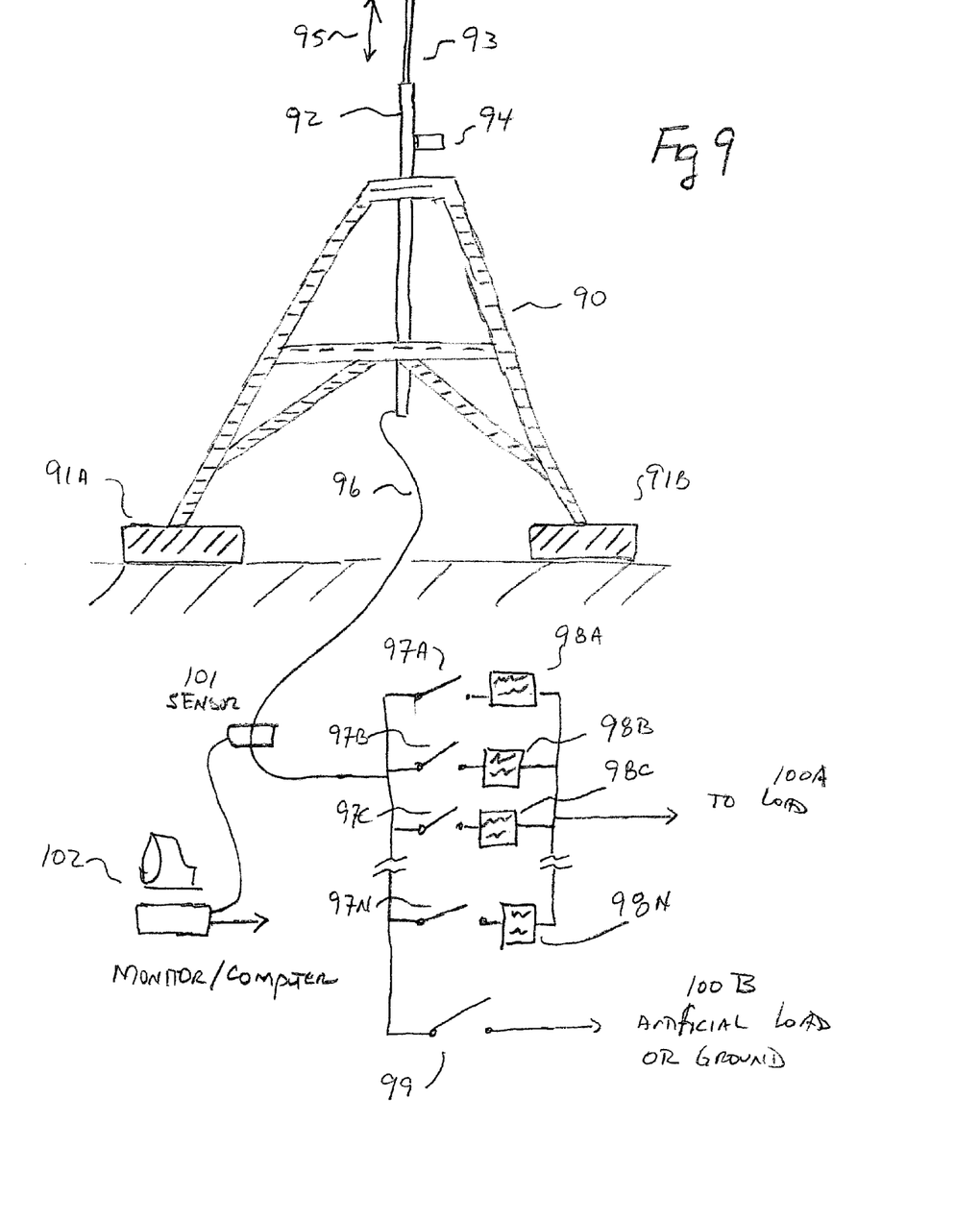
FIG. 9 diagrams the electrical converter system being employed on a stationary structure and the dynamic converter system.

FIG. 9 diagrams the electrical converter system being employed on a stationary structure and the dynamic converter system.

This illustration uses a structure for the collection of the atmospheric energy. The circuit described in this illustration is not to be construed only to this energy collection mechanism, but, is adapted work with any number of energy collection/generation mechanisms, including, but not limited to: solar collectors; wind power generators; wave motion power generators; and, the atmospheric energy collection mechanisms described herein.

The structure of this embodiment is tower 90 which is electrically isolated from the ground via insulators 91A and 91B. In this manner, any atmospheric energy collected is maintained within tower 90.

Conduit 90 contains antenna 93 which is moved up/down as illustrated by arrow 95 by motor 94. Motor 94 is controlled by monitor/computer 102 based upon the electrical energy being collected by antenna 93 and communicated via insulated conductor 96, monitored by sensor 101.

The collected energy is communicated to a bank of switches (97A, 97B, 97C, through 97N, N being any number of switches). In this manner, each switch receives the electrical energy being gathered by antenna 93. As noted earlier, this electrical energy varies depending on the ambient conditions.

Each switch addresses a single converter. As illustrated, switch 97A, when closed, communicates the electrical energy to converter 98A; switch 97B to converter 98B; switch 97C to converter 98C; and so on until switch 97N to converter 98N.

Each converter is designed to accept a range of electrical input and generate a uniform electrical configuration to load 100A.

Monitor/computer 102 monitors the varying electrical input from antenna 93 via sensor 101. Based upon the electrical input, monitor/computer 102 closes a selected one of the switches (and opens all of the rest) so that the voltage being received is directed to the converter designed to handle that voltage.

In some situations, the voltage is so large that (or during emergency) that emergency switch 99 must be closed to direct the voltage to an artificial load or ground either during the switching of switches 97A-97N or to "shut down" the system for repairs/maintenance or if lightning is sensed within a "dangerous" range of tower 90.

In this context, an artificial load is anything that expends the incoming energy, such as lifting a weight to let it fall once switch 99 is opened, or pumping water out of and then into the same reservoir.

It is clear from the foregoing that the present invention captures an entirely new source of electrical energy.

What is claimed is:

1. An electrical converter system comprising:
    a static electricity collector having a conductor that collects static electricity from the atmosphere and outputs a collected energy, the conductor having a height from a stationary structure, the height being adjustable by a motor coupled with the stationary structure;
    a plurality of converters in electrical communication with the conductor, each converter configured to accept a unique range of voltages and producing a uniform electrical output;
    a plurality of switches, each switch receiving an input voltage based on the collected energy from the conductor, and connected to corresponding one of said plurality of converters; and
    a monitor having a sensor that measures the collected energy from the conductor, the monitor operating the motor to adjust the height of the conductor relative to the stationary structure such that the collected energy remains within a selected operating range, the sensor further identifying a level of the input voltage of each of switch to selectively close one of the plurality of switches in response to the level of the input voltage and based on the unique range of voltages.

2. The electrical converter system according to claim 1, further comprising:
    a load; and
    a load switch connecting said input voltage to said load, wherein said monitor closes, when the level of input voltage exceeds a predetermined value, said load switch prior to closing one of said plurality of switches.

3. The electrical converter system according to claim 2, wherein said load switch routes said input voltage to ground.

4. The electrical converter system according to claim 2, wherein said monitor closes said load switch if said input voltage exceeds the unique ranges of voltages for all of said plurality of converters.

5. The electrical converter system according to claim 2, further comprising:
    a lightning sensor generating a signal indicative of a distance to a lightning activity, said monitor closing said load switch when said signal indicative of a distance to a lightning activity is within a prescribed range.

6. The electrical converter system according to claim 2, wherein said monitor opens said load switch after closing one of said plurality of switches.

7. The electrical converter system according to claim 1, wherein said input voltage is direct current.

8. The electrical converter system according to claim 1, wherein said input voltage is alternating current.

9. The electrical converter system according to claim 1, wherein each converter of the plurality of converters converts direct current to alternating current.

10. An electrical system comprising:
    a static electricity collector having a conductor that collects static electricity from the atmosphere and outputs a collected energy, the conductor having a height from a stationary structure, the height being adjustable by a motor coupled with the stationary structure;
    a power generating mechanism in electrical contact with the conductor and generating a variable voltage from the static electricity;
    a power grid electrically connected to consumers of electricity, said power grid operating at a uniform electrical configuration; and,
    a conversion system comprising:
        a plurality of converters, each converter configured to accept a unique range of voltages and producing said uniform electrical configuration to said power grid;
        a plurality of switches, each switch receiving the variable voltage and connected to corresponding one of said plurality of converters; and
    a monitor comprising a sensor that measures the collected energy from the conductor, the monitor operating the motor to adjust the height of the conductor relative to the stationary structure such that the collected energy remains within a selected operating range, the sensor further identifying a level of the variable voltage, and, in response to said level of the variable voltage, selectively closing one of said plurality of switches.

11. The electrical system according to claim 10, wherein said variable voltage is direct current, the direct current being converted to alternating current by the corresponding one of said plurality of converters.

12. The electrical system according to claim 10, wherein said power generating mechanism is reactive to atmospheric voltage.

13. The electrical system according to claim 12, further comprising:
    a lighting sensor generating a signal indicative of a distance to a lightning activity said monitor closing an artificial load switch when said signal indicative of a distance to a lightning activity is within a prescribed range.

14. The electrical converter system according to claim 10, wherein said variable voltage is alternating current.

15. The electrical system according to claim 14, wherein said power generating mechanism is reactive to wind power.

16. An electrical converter system receiving a variable voltage input and connected to a load requiring a set electrical configuration, said system comprising:
    a static electricity collector having a conductor that collects static electricity from the atmosphere and outputs a collected energy, the conductor having a height from a stationary structure, the height being adjustable by a motor coupled with the stationary structure;
    a converter assembly in electrical communication with the conductor comprising:
    a plurality of converters, each converter configured to accept a unique range of voltages from the collected energy and producing the set electrical configuration, and,
    a plurality of switches, each switch receiving the variable voltage input and connected to corresponding one of said plurality of converters;
    a sensor that measures the collected energy from the conductor, the sensor further identifying a level of the variable voltage input; and
    a monitor that operates the motor to adjust the height of the conductor relative to the stationary structure such that the collected energy remains within a selected operating range, the monitor further selectively closing, in response to said level of the input voltage, one of said plurality of switches.

17. The system according to claim 16, further comprising:
a load; and
a load switch connecting said variable voltage input to said load, said monitor closing said load switch prior to closing one of said plurality of switches.

18. The system according to claim 17, wherein said load switch routes said variable voltage input to ground.

19. The system according to claim 17, further comprising:
a lighting sensor generating a signal indicative of a distance to a lightning activity said monitor closing said load switch when said signal indicative of a distance to a lightning activity is within a prescribed range.

20. The system according to claim 16, wherein said monitor closes said load switch if said variable voltage input exceeds the unique range of voltages for all of said plurality of converters.

* * * * *